United States Patent
Araujo et al.

(10) Patent No.: US 12,323,436 B2
(45) Date of Patent: Jun. 3, 2025

(54) MODULATION AND REGULATION OF SYSTEM EVENT MONITORING STREAMS

(71) Applicant: International Business Machines Corporation, Armonk, NY (US)

(72) Inventors: Frederico Araujo, Mahopac, NY (US); Teryl Paul Taylor, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 18/079,621

(22) Filed: Dec. 12, 2022

(65) Prior Publication Data
US 2024/0195818 A1    Jun. 13, 2024

(51) Int. Cl.
*H04L 9/40* (2022.01)
*H04L 67/60* (2022.01)

(52) U.S. Cl.
CPC ...... *H04L 63/1416* (2013.01); *H04L 63/0485* (2013.01); *H04L 67/60* (2022.05)

(58) Field of Classification Search
CPC . H04L 63/1425; H04L 63/1433; H04L 63/20; H04L 63/1441; H04L 63/1416; H04L 63/1408; H04L 43/04; G06F 16/951; G06F 16/2477; G06F 21/577; G06F 21/554; G06F 16/9024; G06F 11/3006; G06F 21/552; G06F 2201/86; G06F 16/24554; G06F 16/278; G06F 7/5324; G06F 16/2474; G06F 21/55; G06F 11/3086; G06F 11/3433; G06F 2201/835; G06F 11/3079; G06F 11/3476; G06F 2221/034; G06F 2201/875; G06F 21/64; G06F 21/6218; G06F 21/57; G06F 16/245; G06F 11/362; G06N 20/00
See application file for complete search history.

(56) References Cited

U.S. PATENT DOCUMENTS

| | | |
|---|---|---|
| 5,835,490 A | 11/1998 | Park |
| 9,256,482 B2 | 2/2016 | Boger |
| 9,286,784 B2 | 3/2016 | Sheleheda |
| 9,501,338 B2 | 11/2016 | Jiahui |
| 2007/0180089 A1* | 8/2007 | Fok ........................ H04W 24/00 709/223 |
| 2012/0060173 A1 | 3/2012 | Malnati |
| 2015/0199406 A1 | 7/2015 | Liang |
| 2019/0102312 A1* | 4/2019 | McDonnell ......... H04L 67/1097 |
| 2020/0285737 A1* | 9/2020 | Kraus .................. G06F 21/552 |

(Continued)

FOREIGN PATENT DOCUMENTS

| | | |
|---|---|---|
| CN | 101360310 A | 2/2009 |
| KR | 100228401 | 9/1998 |

OTHER PUBLICATIONS

Sangam Vamsi, "Trie Tree Implementation", Theory of Programming, Jan. 16, 2015, 11 pages.

*Primary Examiner* — Chris Parry
*Assistant Examiner* — Abderrahmen Chouat
(74) *Attorney, Agent, or Firm* — Tihon Poltavets

(57) ABSTRACT

An approach is disclosed that receives system events corresponding to event occurrences that occur at an information handling system. The system events are combined into a set of one or more coalesced events, wherein the combining is based on a root node associated with the system events. The coalesced events are then transmitted to a security information and event management (SIEM) system.

15 Claims, 6 Drawing Sheets

(56) References Cited

U.S. PATENT DOCUMENTS

| | | | | |
|---|---|---|---|---|
| 2021/0006542 A1* | 1/2021 | Myneni | ............... | H04L 63/20 |
| 2021/0342411 A1 | 11/2021 | Nissam | | |
| 2021/0352136 A1* | 11/2021 | Dojka | ............... | H04L 67/34 |
| 2022/0027820 A1* | 1/2022 | Chalam | ............... | G06Q 10/02 |
| 2024/0129276 A1* | 4/2024 | Lamias | ............... | H04L 63/0263 |
| 2024/0179154 A1* | 5/2024 | Goknel | ............... | H04L 63/20 |

* cited by examiner

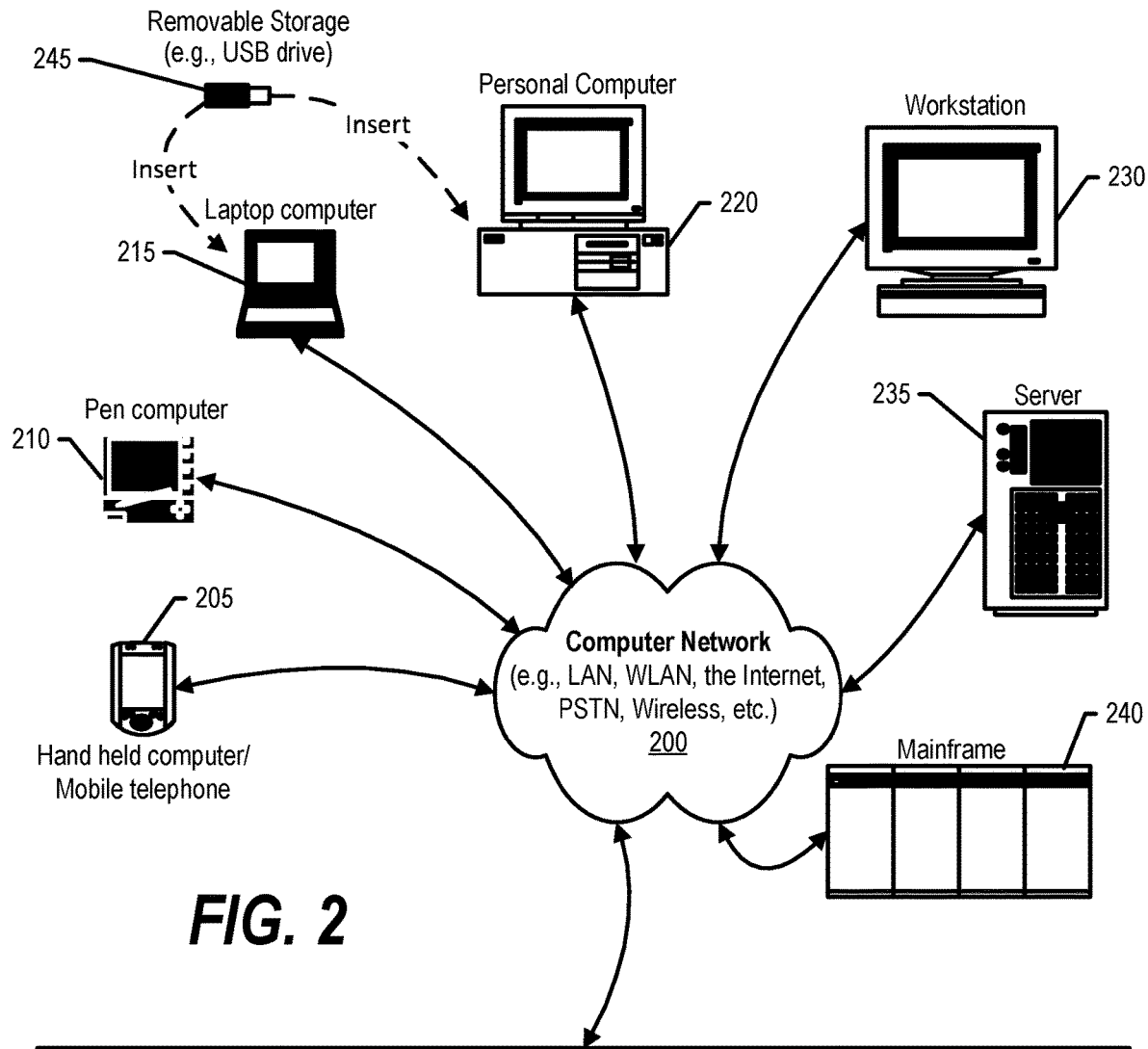
FIG. 2
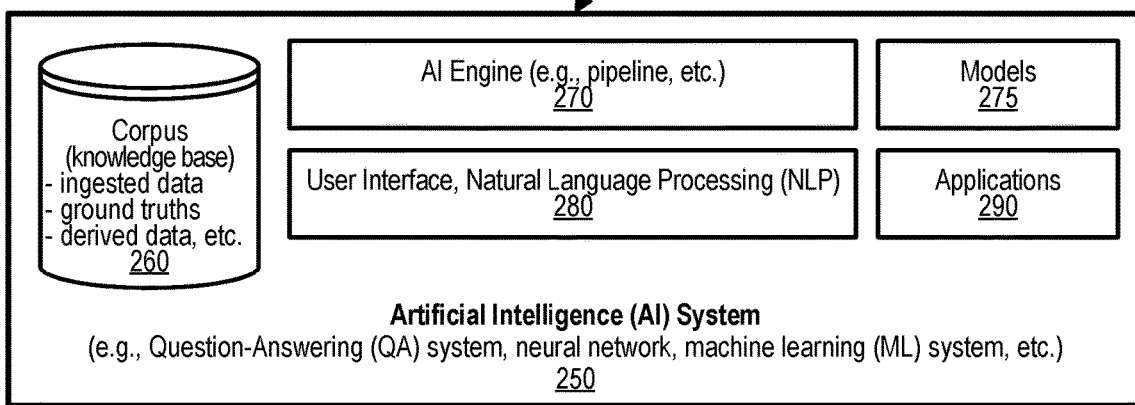

MODULATION AND REGULATION OF SYSTEM EVENT MONITORING STREAMS

BACKGROUND

Field of the Invention

This disclosure relates to the processing and transmission of digital information. More particularly, this disclosure relates to Security Information and Event Monitoring (SIEM) technology.

Description of Related Art

Commercial Security Information and Event Management (SIEM) products typically charge by ingestion rates (events per second) making it costly to gain full visibility into container and host workloads due to the excessive number of system events and logs generated by commonly deployed monitors (e.g., a userspace component to an operating system's audit process, etc.). Furthermore, such event streams lead to redundant and noisy alert feeds that can overwhelm security operations personnel and lead to event fatigue. Products based on system call and log monitoring require constant manual tuning to limit event rates, and fatigue, which is not ideal in cases where the monitored workloads are dynamic.

SUMMARY

An approach is disclosed that receives system events corresponding to event occurrences that occur at an information handling system. The system events are combined into a set of one or more coalesced events. The combining is based on a root node associated with the system events. The coalesced events are then transmitted to a security information and event management (SIEM) system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein:

FIG. 2 provides an extension of the information handling system environment shown in FIG. 1 to illustrate that the methods described herein can be performed on a wide variety of information handling systems which operate in a networked environment;

DETAILED DESCRIPTION

Figure 1:
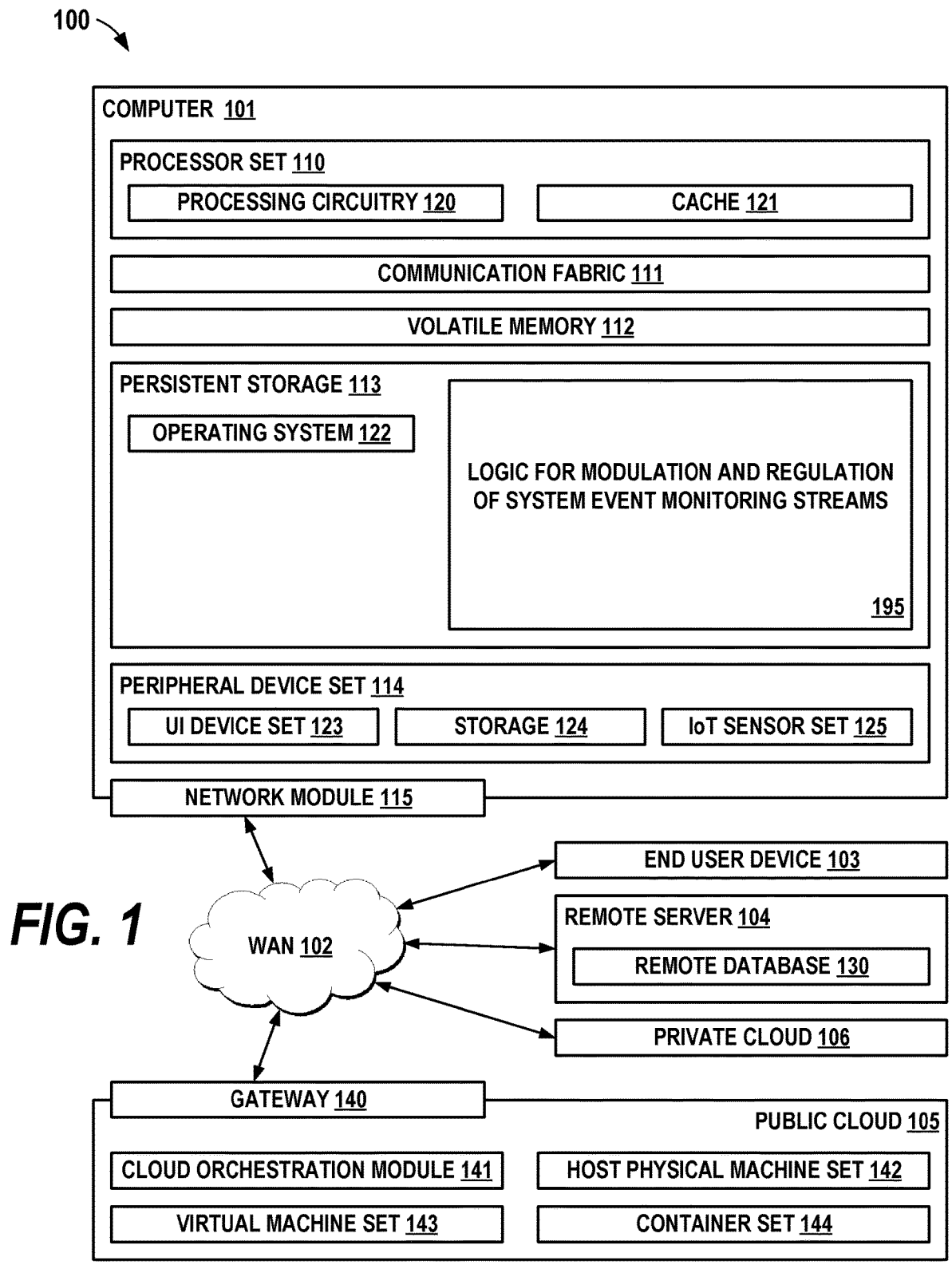
FIG. 1 is a block diagram of a data processing system in which the methods described herein can be implemented.

FIGS. 1-6 describe an approach that addresses issues of event fatigue and manual tuning, by automatically creating a compact and stateful process graph for each workload in the cloud. The graph is used to decide which events to forward, and which events to summarize or drop based on an event rate constraint, and the uniqueness and frequency of the events. Filtering is automatically done based on the history and state of the graph, which allows process contextual information to be used to more intelligently summarize and forward events to the SIEM.

This rate-limiting approach modulates the stream of system events (i.e., system calls) to deduplicate and coalesce behaviors that share the same location in the process provenance chain (i.e., context), yielding event output streams that preserves the execution semantics of what is being monitored (no security-relevant information loss), without manual filtering, and that are considerably smaller than typical system call event monitoring streams. When applied to threat and intrusion detection, the modulated telemetry reduces the number of alerts and improves the efficiency of threat investigations by increasing the signal to noise ratio.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a data processing system in which the methods described herein can be implemented. Computing environment 100 contains an example of an environment for the execution of at least some of the computer code involved in performing the inventive methods, such as shown in the description of block 195. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A NETWORKED ENVIRONMENT is shown in FIG. 2. The networked environment provides an extension of the information handling system shown in FIG. 1 illustrating that the methods described herein can be performed on a wide variety of information handling systems that operate in a networked environment, depicted by computer network 200. Types of computer networks can include local area networks (LANs), wide area networks (WANs), the Internet, peer-to-peer networks, public switched telephone networks (PSTNs), wireless networks, etc. Types of information handling systems range from small handheld devices, such as handheld computer/mobile telephone 205 to large mainframe systems, such as mainframe computer 240. Examples of handheld computer 205 include smart phones, personal digital assistants (PDAs), personal entertainment devices, such as MP3 players, portable televisions, and compact disc players. Other examples of information handling systems include pen, or tablet, computer 210, laptop, or notebook, computer 215, personal computer 220, workstation 230, and server computer system 235. Other types of information handling systems that are not individually shown in FIG. 2 can also be interconnected other computer systems via computer network 200.

Many of the information handling systems include nonvolatile data stores, such as hard drives and/or nonvolatile memory depicted in FIG. 1. These nonvolatile data stores and/or memory can be included, or integrated, with a particular computer system or can be an external storage device, such as an external hard drive. In addition, removable nonvolatile storage device 245 can be shared among two or more information handling systems using various techniques, such as connecting the removable nonvolatile storage device 245 to a USB port or other connector of the information handling systems.

An ARTIFICIAL INTELLIGENCE (AI) SYSTEM is depicted at the bottom of FIG. 2. Artificial intelligence (AI) system 250 is shown connected to computer network 200 so that it is accessible by other computer systems 205 through 240. AI system 250 runs on one or more information handling systems (comprising one or more processors and one or more memories, and potentially any other computing device elements generally known in the art including buses, storage devices, communication interfaces, and the like) that connects AI system 250 to computer network 200. The network 200 may include multiple computing devices 104 in communication with each other and with other devices or components via one or more wired and/or wireless data communication links, where each communication link may comprise one or more of wires, routers, switches, transmitters, receivers, or the like. AI system 250 and network 200 may enable functionality, such as question/answer (QA) generation functionality, for one or more content users. Other embodiments of AI system 250 may be used with components, systems, sub-systems, and/or devices other than those that are depicted herein.

AI system 250 maintains corpus 260, also known as a "knowledge base," which is a store of information or data that the AI system draws on to solve problems. This knowledge base includes underlying sets of facts, ground truths, assumptions, models, derived data, and rules which the AI system has available in order to solve problems. In one embodiment, a content creator creates content in corpus 260. This content may include any file, text, article, or source of data for use in AI system 250. Content users may access AI system 250 via a network connection or an Internet connection to the network 200, and, in one embodiment, may input questions to AI system 250 that may be answered by the content in the corpus of data. As further described below, when a process evaluates a given section of a document for semantic content, the process can use a variety of conventions to query it from the AI system.

AI system 250 may be configured to receive inputs from various sources. For example, AI system 250 may receive input from the network 200, a corpus of electronic documents or other data, a content creator, content users, and other possible sources of input. In one embodiment, some or all of the inputs to AI system 250 may be routed through the network 200. The various computing devices on the network 200 may include access points for content creators and content users. Some of the computing devices may include devices for a database storing the corpus of data. The network 200 may include local network connections and remote connections in various embodiments, such that AI system 250 may operate in environments of any size, including local and global, e.g., the Internet. Additionally, AI system 250 serves as a front-end system that can make available a variety of knowledge extracted from or represented in documents, network-accessible sources and/or structured data sources. In this manner, some processes populate the AI system with the AI system also including input interfaces to receive knowledge requests and respond accordingly.

AI Engine 270, such as a pipeline, is an interconnected and streamlined collection of operations. The information works its way into and through a machine learning system, from data collection to training models. During data collection, such as data ingestion, data is transported from multiple sources, such as sources found on the Internet, into a centralized database stored in corpus 260. The AI system can then access, analyze, and use the data stored in its corpus.

Models 275 are the result of AI modeling. AI modeling is the creation, training, and deployment of machine learning algorithms that emulate logical decision-making based on the data available in the corpus with the system sometimes utilizing additional data found outside the corpus. AI models 275 provide AI system 250 with the foundation to support advanced intelligence methodologies, such as real-time analytics, predictive analytics, and augmented analytics.

User interface 280, such as Natural Language (NL) Processing (NLP) is the interface provided between AI system 200 and human uses. Semantic content is content based on the relation between signifiers, such as words, phrases, signs, and symbols, and what they stand for, their denotation, or connotation. In other words, semantic content is content that interprets an expression, such as by using NLP. Semantic data is stored as part of corpus 260. In one embodiment, the process sends well-formed questions (e.g., natural language questions, etc.) to the AI system. AI system 250 may interpret the question and provide a response to the content user containing one or more answers to the question. In some embodiments, AI system 250 may provide a response to users in a ranked list of answers. Other types of user interfaces (UIs) can also be used with AI system 250, such as a command line interface, a menu-driven interface, a Graphical User Interface (GUI), a Touchscreen Graphical User Interface (Touchscreen GUI), and the like.

AI applications 290 are various types of AI-centric applications focused on one or more tasks, operations, or environments. Examples of different types of AI applications include search engines, recommendation systems, virtual assistants, language translators, facial recognition and image labeling systems, and question-answering (QA) systems.

In some illustrative embodiments, AI system 250 may be a question/answering (QA) system, which is augmented with the mechanisms of the illustrative embodiments described hereafter. A QA type of AI system 250 may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the I QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Figure 3:
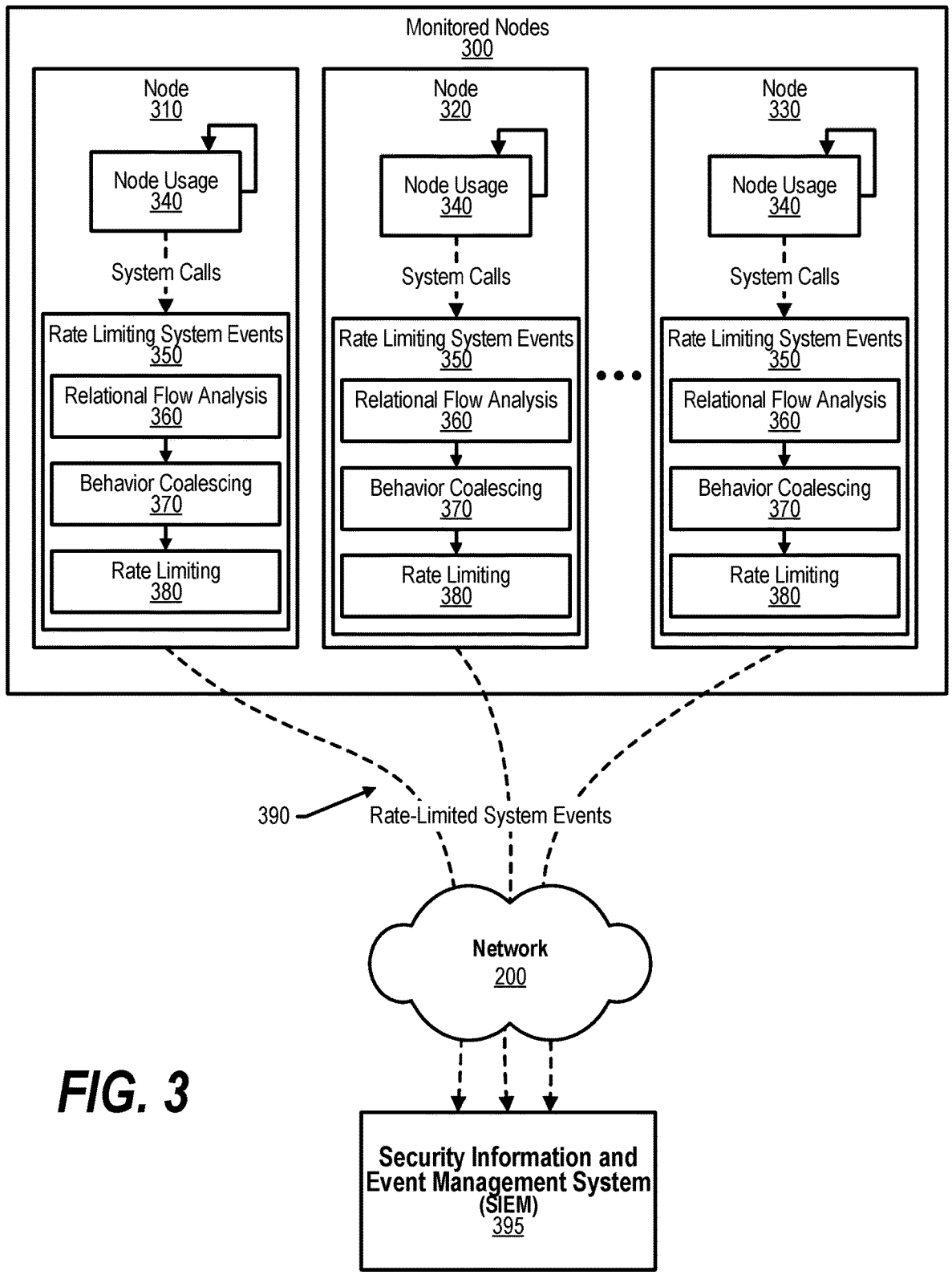
FIG. 3 is a component diagram depicting the various components utilized in modulating and regulating system event monitoring streams.

FIG. 3 is a component diagram depicting the various components utilized in modulating and regulating system event monitoring streams. Monitored nodes 300 are depicted as having any number of nodes (310, 320, and 330) with each node undertaking various amounts of node usage 340. Node usage generates system calls that are ingested by rate limiting system events process 350.

Rate limiting system events process 350 ingests a set of system calls, typically generated from the OS kernel, during node usage 340. Rate limiting system events process 350 can be broken into three subprocesses that operate on the ingested system call data before the results 390 are forwarded to SIEM 395 via computer network 200. These three subprocesses include relational flow analysis subprocess 360, behavior coalescing subprocess 370, and rate limiting subprocess 380.

Relational flow analysis subprocess 360 summarizes the data into an entity-relational format representing process behaviors and records how a process interacts with the broader system. For example, how the process interacts with the file system, the network, containers and with other processes.

Figure 4:
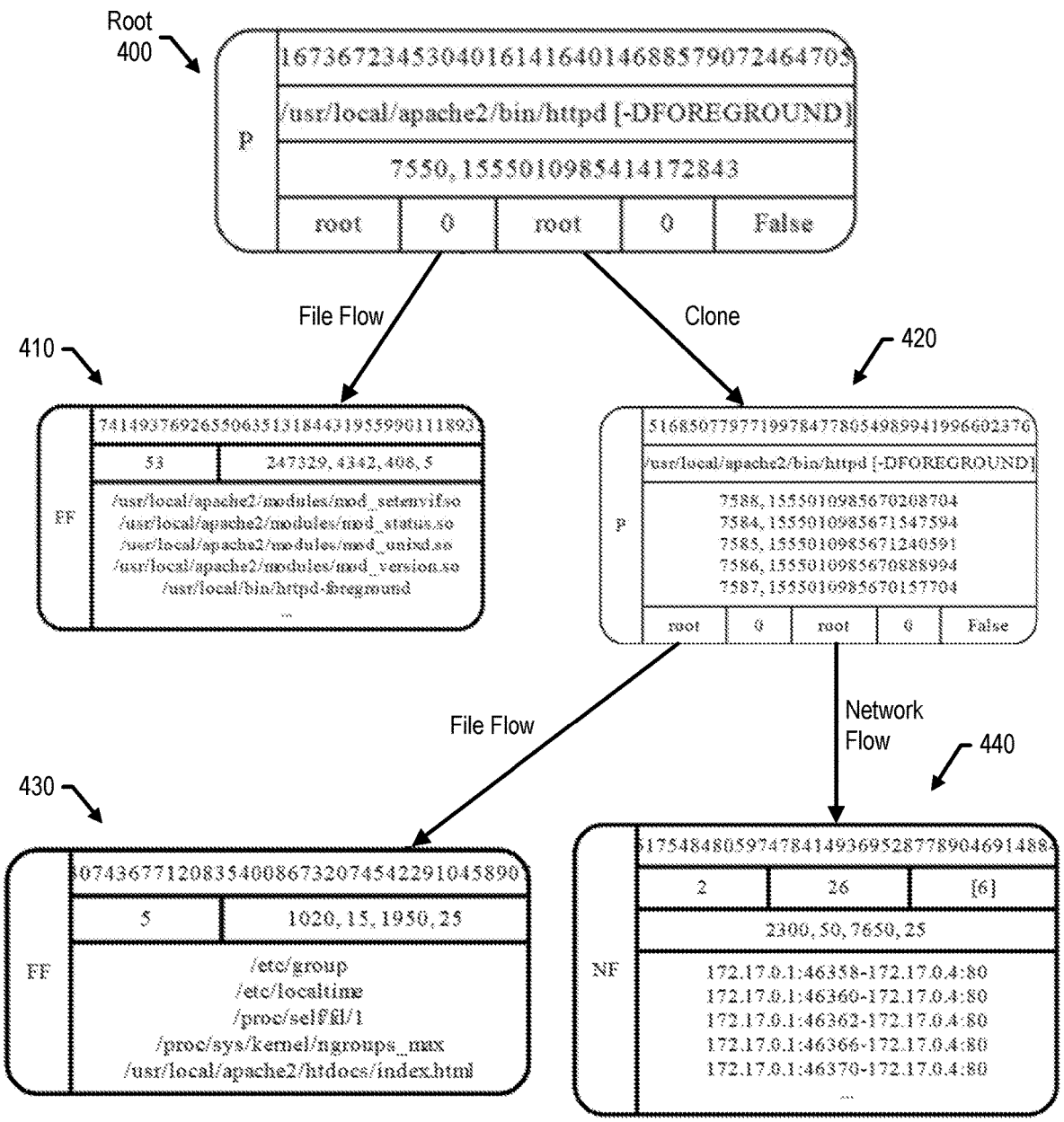
FIG. 4 is a diagram depicting an example graph showing that each process node can have one or more file and network nodes representing a coalescing of behaviors by system operation.

Behavior coalescing subprocess 370 streams the data into functionality that builds a graph from the streamed data. Subprocess 370 builds an entity-relational graph of process behaviors. The graph contains several different types of nodes. The first type of node is a process node, which is used to establish a process graph. A unique feature of each process node, is that the process node does not represent each individual instance of a process in the system, with a unique process identifier (pid), but rather a process node represents a coalescing of individual process instances into a single node that have the same attributes, and position in the graph. FIG. 4 demonstrates this concept in an example graph.

The approach can further summarize each individual node. In one embodiment, a traversal algorithm is used that walks the graph, such as shown in FIG. 4, at time intervals and summarizes the accumulated records based on semantic similarity (e.g., network tuples, file paths, path prefixes, process command lines, etc.). Summarizing merges similar records together. For example, a flow represents all the reads/write (send/receive) operations associated with a connection or a session. Summarization will merge these similar connections (or file) accesses into a single record and aggregate the number of operations and bytes sent into a single record. This process generates a reduced subset of summarized records that are then forwarded downstream, such as to the security information and event management (SIEM) system.

FIG. 4 is a diagram depicting an example graph showing that each process node can have one or more file and network nodes representing a coalescing of behaviors by system operation.

The initial node (root node 400) at the root of the graph represents root/master httpd daemon of an apache server. The child httpd daemon in the diagram (clone node 420) is a single node representing the coalescing of multiple process instances with the same exe command, userid, tty, etc. In one embodiment, cloned nodes are used because cloned processes can have different roles from the root process. For example, apache webservers usually have a single root process that manages a set of worker processes that perform the majority of the server's work. The root process has a different role than the worker nodes, therefore, in this embodiment, the root and clone nodes are separated. In addition, it is unknown whether a clone node is not going to be followed by an exec( ) that will change the child process to something else. This is common with runc process, for example for containers. In addition, the location of each node in the process provenance chain is noted in the graph. In this particular case, the "root" httpd process has a difference parent (e.g., init) than the child processes, whose parent is httpd. This allows the approach to capture the hierarchy and multi-process execution semantics of the application.

Each process node (e.g., process nodes 400 and 420) can have file nodes (e.g., file nodes 410 and 430) and network nodes (e.g., network node 440), which represent a coalescing of behaviors by system operation (e.g., read, write, send, receive, delete, etc.). Such a representation allows the approach to keep graphs (e.g., data structures, etc.) relatively small so that they can be built in a streaming fashion but still maintain all the contextual information about process behavior that enable smart observability.

A single network flow node (node 440) is depicted from cloned node 420 but no network node is depicted from root node 400. However, both root node 400 and cloned node 420 are depicted as having an associated file node (file nodes 410 and 430, respectively). In one embodiment, this is because Httpd in this setup with Apache's pre-forked multi-processing module (MPM), where there is a main "root" process that bootstraps the webserver, reads httpd.conf, spawns the worker processes, and handles client requests to its children (workers). Note that the set of file flows (FFs) for root node 400 differs from the children (clone node 420). Also note that the children are essentially "clones" of the parent, so they inherit all file descriptors from their parent ("root"), such as shared libraries, configuration files, etc. The workers are indeed the processes handling the client HTTP requests, reading and processing the html documents requested. Note that this graphlet denotes a behavior that is specific to an Apache webserver. Other non-Apache environments would likely have different graphlet node configurations. In addition, the graphlet distinguishes between behaviors of the processes. For example, a root process can load different files than a child process even though they are the same process image, and this might indicate a security issue.

While no network flow (NF node) is shown for root node 400, there could be a NF for the "root" process if the approach recorded the bootstrap phase of this webserver (i.e., when the root process initializes and listens/binds to the network ports where the web server accepts connections). The graph depicted in FIG. 4 depicts flows captured capture after the server had already bootstrapped (meaning the monitoring agent was started after the server bootstrapped), so the graphlet depicts the runtime behaviors observed after that point in time, which essentially confirms that the children are the processes handling the network requests (as denoted by the NF nodes associated with them). A graphlet could be made that captures the bootstrap of the webserver as well.

Figure 5:
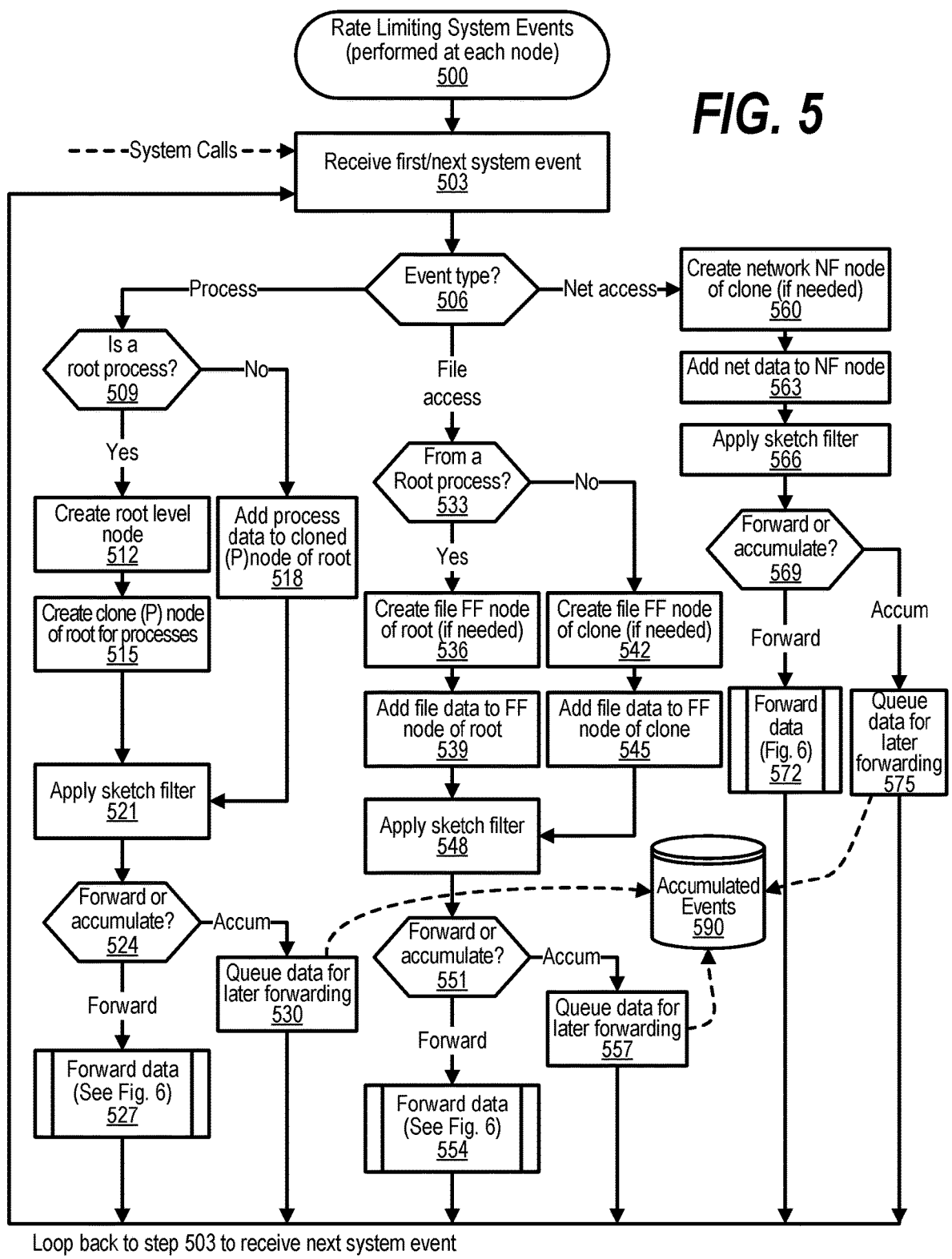
FIG. 5 is a flowchart depicting a rate limiting system events process that is performed by each node utilizing the approach.

FIG. 5 is a flowchart depicting a rate limiting system events process that is performed by each node utilizing the approach. FIG. 5 processing commences at 500 and shows the steps taken by a rate limiting system events processed that is performed by each node sending data to a Security Information and Event Monitoring (SIEM) system. At step 503, the process receives the first system event from the node's event monitor. The process determines the type of system event that was received (decision 506). If the system event is a process event, then decision 506 branches to the 'process' branch to perform steps 509 through 530. If the system event is a file access event, then decision 506 branches to the 'file access' branch to perform steps 533 through 557. If the system event is a network access event, then decision 506 branches to the 'net access' branch to perform steps 560 through 575.

Steps 509 through 530 are performed when a process event is encountered. The process determines whether the process is a root process (decision 509). If the process is a root process, then decision 509 branches to the 'yes' branch to perform steps 512 and 515. At step 512, the process creates a root level process node (see, e.g., P node 400 on FIG. 4) and, at step 515, the process creates a clone process (P) node of the root node (see, e.g., P node 420 on FIG. 4) for storing process event data occurring in the root node. On the other hand, if the process is not a root process, then decision 509 branches to the 'no' branch whereupon, at step 518, the process adds the process data from the system event to the cloned process (P) node of the root process. At step 521, the process applies a sketch filter. The contextual rate limiting step of the approach capitalizes on the graph shown in FIG. 4 as a central structure in the modulation algorithm. It is complemented with a set of compact node-level probabilistic data structures called sketches that regulate the frequency of system event forwarding. In one embodiment, the process uses two types of node rate limiters. The first is a count-min sketch which estimates how often a particular behavior has been seen, and is used to regulate heavy hitter processes which generate thousands of redundant records based on some threshold. The second is a HyperLogLog (HLL) sketch which estimates the cardinality of a node and is used to regulate scanners based on some threshold. Records that are considered scanners or heavy hitters are summarized to limit event exportation and burstiness.

The process determines as to whether this event should be forwarded to the SIEM now or accumulated and sent later (decision 524). In one embodiment, a rate-limiting function is used to determine whether to immediately forward an event or queue the event data in queue 590 when the rate limiting function reveals that the system is quite busy and the result of the rate limiting function exceeds a predetermined threshold (see FIG. 6 steps 620 and 625 and corresponding textual descriptions for further discussion of one embodiment of a rate limiting function).

Figure 6:
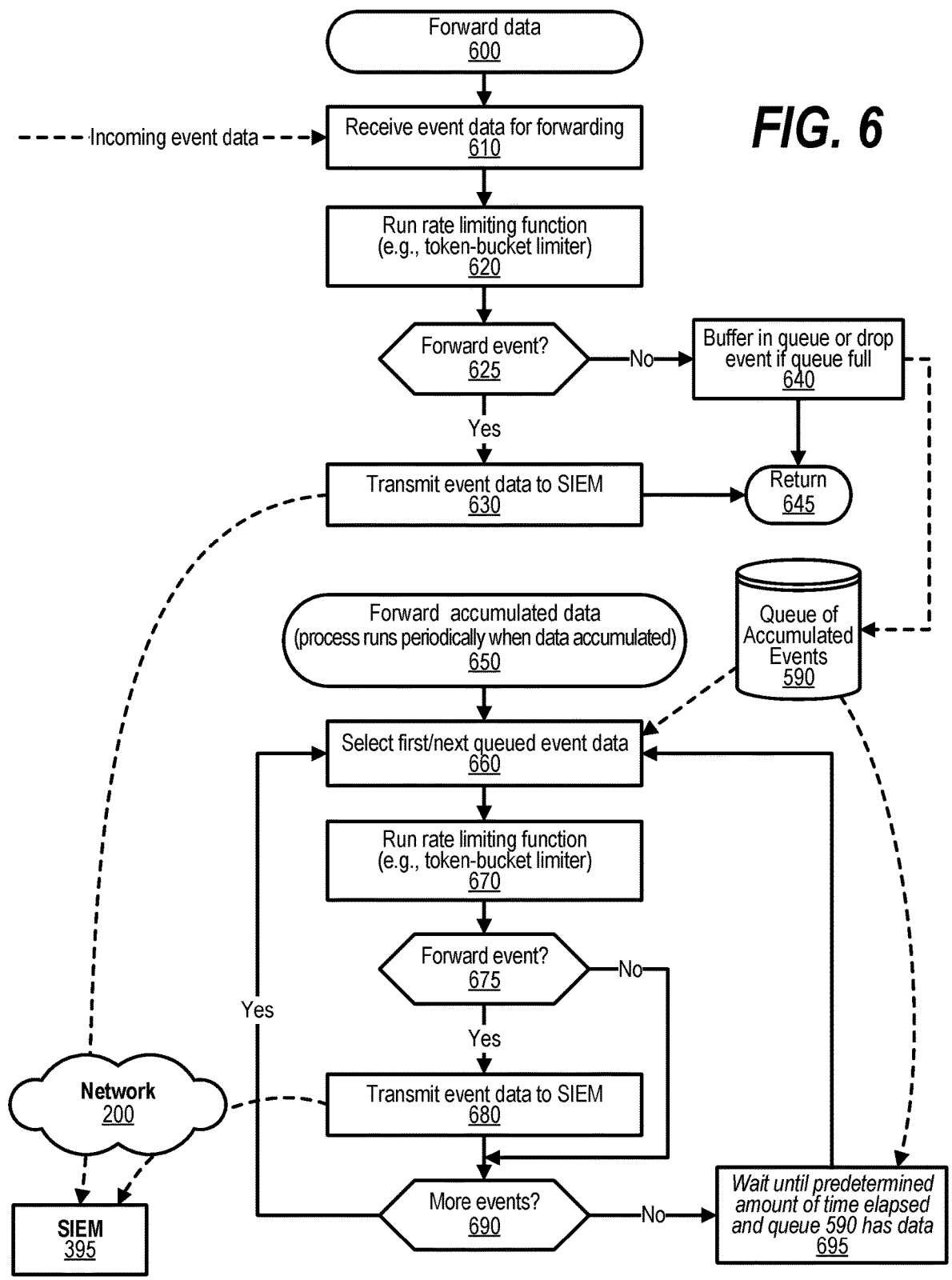
FIG. 6 is a flowchart depicting a process used to forward rate-limited and coalesced data to a Security Information and Event Management (SIEM) system.

If this event should be forwarded to the SIEM now, then decision 524 branches to the 'forward' branch whereupon, at predefined process 527, the process performs the Forward Data routine (see FIG. 6 and corresponding text for processing details). On the other hand, if this event should not be forwarded to the SIEM now due to system load, then decision 524 branches to the 'accum' branch whereupon, at step 530, the process queues data in data store 590 for later forwarding to the SIEM system.

Steps 533 through 557 are performed when a file access event is encountered. The process determines whether the file access is from a root process (decision 533). If the file access is from a root process, then decision 533 branches to the 'yes' branch whereupon, at step 536, the process creates a file flow (FF) node (see, e.g., FF node 410 on FIG. 4) from the root process (if not already created), and, at step 539, the process adds the file data from the system event to file flow (FF) node of the root process (see, e.g., data within FF node 410 on FIG. 4).

On the other hand, if the file flow system event is not from a root process, then decision 533 branches to the 'no' branch whereupon, at step 542, the process creates file FF node (see, e.g., FF node 430 on FIG. 4) of the clone process (if a file flow from the clone has not yet been created), and, at step 545, the process adds the system event file data to the file flow (FF) node of the clone process (see, e.g., data within FF node 430 on FIG. 4). At step 548, the process applies one or more sketch filters as discussed in description of step 521.

The process determines as to whether this event should be forwarded to the SIEM now or accumulated and sent later (decision 551) using a rate limiting function described above with respect to decision 524. If this event should be forwarded to the SIEM now, then decision 551 branches to the 'forward' branch whereupon, at predefined process 554, the process performs the Forward Data routine (see FIG. 6 and corresponding text for processing details). On the other hand, if this event should not be forwarded to the SIEM now due to system load, then decision 551 branches to the 'accum' branch whereupon, at step 557, the process queues data in data store 590 for later forwarding to the SIEM system.

Steps 560 through 575 are performed when a network access event is encountered. At step 560, the process creates a network flow (NF) node (see, e.g., NF node 440 on FIG. 4) of the clone (if the network flow node has not yet been created). At step 563, the process adds the system event data to the network flow node (see, e.g., data within NF node 440 on FIG. 4). At step 566, the process applies one or more sketch filters as discussed in description of step 521. While a network flow (NF) node is not shown being created from the root process as, in some embodiments, the processes of the root contained in the cloned process (P) handle the network processes, a network flow (NF) could be added to the root node, much like the file access event data was shown being added to the file flow (FF) of the root node in steps 536 and 539.

The process determines whether this event should be forwarded to the SIEM now or accumulated and sent later (decision 569) using a rate limiting function described above with respect to decision 524. If this event should be forwarded to the SIEM now, then decision 569 branches to the 'forward' branch whereupon, at predefined process 572, the process performs the Forward Data routine (see FIG. 6 and corresponding text for processing details). On the other hand, if this event should not be forwarded to the SIEM now due to system load, then decision 569 branches to the 'accum' branch whereupon, at step 575, the process queues the data in data store 590 for later forwarding to the SIEM system.

After the received event data has been processed, as described above, processing loops back to step 503 to receive and process the next set of system event data.

FIG. 6 is a flowchart depicting a process used to forward rate-limited and coalesced data to a Security Information and Event Management (SIEM) system. FIG. 6 processing used to forward coalesced event data from a node to a Security Information and Event Monitor (SIEM) system commences at 600. At step 610, the process receives the coalesced event data for forwarding to the SIEM system.

Beyond node-level regulation, a global regulator ensures rate constraints are enforced at a global level using a leaky-bucket (token reservation) algorithm. At step 620, the process runs a rate limiting function (e.g., token-bucket limiter) that provides an indicator (value) regarding the event flow rate from the node. In one embodiment using a token-bucket limiter, a virtual "bucket" is established with tokens being added to the bucket at a predetermined rate. The bucket holds a maximum number of tokens. To decide whether to forward an event from the node to the SIEM system, if one or more tokens are available in the bucket, then a token is removed (decremented) from the bucket and the coalesced event data is forwarded to the SIEM system. However, if no tokens are available in the bucket, then the event is stored in a queue of accumulated events 590. In one embodiment, the queue has a maximum size and, in this embodiment, when the size is reached then the event data is discarded (dropped) rather than being accumulated in queue 590.

Based on the result of the rate limiting function, the process determines as to whether to forward the received event data (decision 625). If the event data is being forwarded (and not queued or dropped), then decision 625 branches to the 'yes' branch whereupon, at step 630, the process transmits the coalesced event data to SIEM 395 via network 200. On the other hand, if the event data is not being forwarded at this time, then decision 625 branches to the 'no' branch whereupon, at step 640, the process buffers the received coalesced event data in queue 590, or discards (drops) the event if queue 590 is full. FIG. 6 processing of the forward data request thereafter returns to the calling routine (see FIG. 5) at 645.

FIG. 6 processing used to forward accumulated data from queue 590 to the Security Information and Event Monitor (SIEM) system commences at 650. This process runs periodically when data accumulated in queue 590. At step 660, the process selects the first queued event data from data store 590. At step 670, the process runs a rate limiting function, such as a token-bucket limiter function described previously in step 620.

Based on the result of the rate limiting function, the process determines whether to forward the selected event data to SIEM 395 (decision 675). If the selected event data is being forwarded, then decision 675 branches to the 'yes' branch whereupon, at step 680, the process transmits the event data to SIEM 395 via computer network 200. On the other hand, if the rate limiting function indicates that the system is too busy and that the event data is not being forwarded at this time, then decision 675 branches to the 'no' branch bypassing step 680.

The process determines whether there are more events queued in data store 590 to process (decision 690). If there are more queued events, then decision 690 branches to the 'yes' branch which loops back to step 660 to select and process the next event data from queue 590. This looping continues until all of the event data queued in data store 590 have been processed or until the rate limiting function results in a determination to cease forwarding event data at this time due to the system being too busy (decision 675 branching to the 'no' branch), at which point decision 690 branches to the 'no' branch exiting the loop.

At step 695, processing waits for a predetermined amount of time to elapse (e.g., a number of seconds, etc.) and also until queue 590 is not empty (has event data to process), at which point processing loops back to step 660 to repeat the processing of queued event data from queue 590 that forwards data to the SIEM system as described above.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving a plurality of system events corresponding to event data at the information handling system;
   combining the plurality of system events into a set of one or more coalesced events, wherein the combining is based on a root node associated with each of the plurality of system events;
   performing a rate limiting function utilizing a token reservation algorithm with a token bucket and a token-bucket limiter, wherein the token-bucket limiter utilizes a predetermined rate to add tokens to the token bucket;

determining a token is available in the token bucket for transmitting the set of one or more coalesced events to a security information and event management (SIEM) system;

removing the token from the token bucket; and transmitting, based on the removing of the token from the token bucket, the set of one or more coalesced events to the security information and event management (SIEM) system.

2. The method of claim 1 further comprising:

combining a set of the plurality of system events related to a plurality of processes that correspond to the root node into one or more coalesced process flow events.

3. The method of claim 1 further comprising:

combining a set of the plurality of system events related to a plurality of file accesses that correspond to the root node into one or more coalesced file flow events.

4. The method of claim 1 further comprising:

combining a set of the plurality of system events related to a plurality of network accesses that correspond to the root node into one or more coalesced network flow events.

5. The method of claim 1 further comprising:

combining a first set of the plurality of system events related to a plurality of processes that correspond to the root node into one or more coalesced process flow events;

combining a second set of the plurality of system events related to a plurality of file accesses that correspond to the root node into one or more coalesced file flow events; and combining a third set of the plurality of system events related to a plurality of network accesses that correspond to the root node into one or more coalesced network flow events.

6. An information handling system comprising:

one or more processors;

a set of instructions stored in a memory and executed by at least one processor of the one or more processors to perform steps comprising:

receiving a plurality of system events corresponding to event data at the information handling system;

combining the plurality of system events into a set of one or more coalesced events, wherein the combining is based on a root node associated with each of the plurality of system events;

performing a rate limiting function utilizing a token reservation algorithm with a token bucket and a token-bucket limiter, wherein the token-bucket limiter utilizes a predetermined rate to add tokens to the token bucket;

determining a token is available in the token bucket for transmitting the set of one or more coalesced events to a security information and event management (SIEM) system;

removing the token from the token bucket; and transmitting, based on the removing of the token from the token bucket, the set of one or more coalesced events to the security information and event management (SIEM) system.

7. The information handling system of claim 6, further comprise:

combining a set of the plurality of system events related to a plurality of processes that correspond to the root node into one or more coalesced process flow events.

8. The information handling system of claim 6, further comprise:

combining a set of the plurality of system events related to a plurality of file accesses that correspond to the root node into one or more coalesced file flow events.

9. The information handling system of claim 6, further comprise:

combining a set of the plurality of system events related to a plurality of network accesses that correspond to the root node into one or more coalesced network flow events.

10. The information handling system of claim 6, further comprise:

combining a first set of the plurality of system events related to a plurality of processes that correspond to the root node into one or more coalesced process flow events;

combining a second set of the plurality of system events related to a plurality of file accesses that correspond to the root node into one or more coalesced file flow events; and combining a third set of the plurality of system events related to a plurality of network accesses that correspond to the root node into one or more coalesced network flow events.

11. A computer program product comprising:

a computer readable storage medium comprising a set of computer instructions, the set of computer instructions effective to perform steps comprising:

receiving a plurality of system events corresponding to event data at an information handling system;

combining the plurality of system events into a set of one or more coalesced events, wherein the combining is based on a root node associated with each of the plurality of system events;

performing a rate limiting function utilizing a token reservation algorithm with a token bucket and a token-bucket limiter, wherein the token-bucket limiter utilizes a predetermined rate to add tokens to the token bucket;

determining a token is available in the token bucket for transmitting the set of one or more coalesced events to a security information and event management (SIEM) system;

removing the token from the token bucket; and transmitting, based on the removing of the token from the token bucket, the set of one or more coalesced events to the security information and event management (SIEM) system.

12. The computer program product of claim 11, further comprise:

combining a set of the plurality of system events related to a plurality of processes that correspond to the root node into one or more coalesced process flow events.

13. The computer program product of claim 11, further comprise:

combining a set of the plurality of system events related to a plurality of file accesses that correspond to the root node into one or more coalesced file flow events.

14. The computer program product of claim 11, further comprise:

combining a set of the plurality of system events related to a plurality of network accesses that correspond to the root node into one or more coalesced network flow events.

15. The computer program product of claim 11, further comprise:

combining a first set of the plurality of system events related to a plurality of processes that correspond to the root node into one or more coalesced process flow events;

combining a second set of the plurality of system events related to a plurality of file accesses that correspond to the root node into one or more coalesced file flow events; and combining a third set of the plurality of system events related to a plurality of network accesses that correspond to the root node into one or more coalesced network flow events.

\* \* \* \* \*